United States Patent [19]
DeHart

[11] 3,986,638
[45] Oct. 19, 1976

[54] SEED PLANTER

[76] Inventor: Harold F. DeHart, Rte. 5, Box 190E, Durham, N.C. 27704

[22] Filed: May 1, 1975

[21] Appl. No.: 573,412

[52] U.S. Cl. .............................. 221/150 A; 221/211
[51] Int. Cl.² ........................................ A24F 27/14
[58] Field of Search .................. 221/211, 278, 150; 111/1

[56] References Cited
UNITED STATES PATENTS

| | | | |
|---|---|---|---|
| 2,124,670 | 7/1938 | Johnson | 221/211 X |
| 2,546,838 | 3/1951 | Tasche | 221/211 X |
| 3,627,173 | 12/1971 | Kerker | 221/211 |
| 3,738,530 | 6/1973 | Fine | 221/211 |
| 3,750,832 | 8/1973 | Ovarnstrom | 111/1 |

Primary Examiner—Allen N. Knowles
Attorney, Agent, or Firm—B. B. Olive

[57] ABSTRACT

Various types of seeds are planted in a coordinate array in flats or in peat cups situated in trays by means of vacuum pick-up of the seeds by a hand manipulated seed pick-up head which holds the seeds in the operator's view and transfers them to a plurality of tubes which guide the seeds upon release of the vacuum into the peat cups by gravity feed.

12 Claims, 9 Drawing Figures

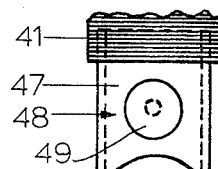
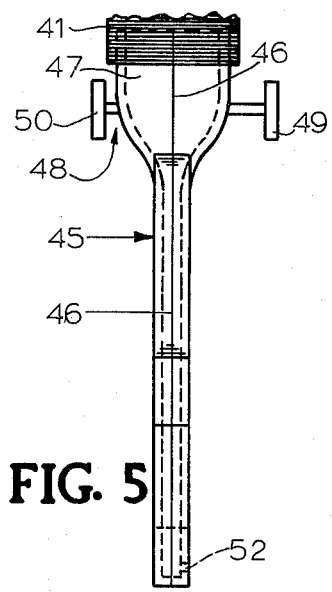
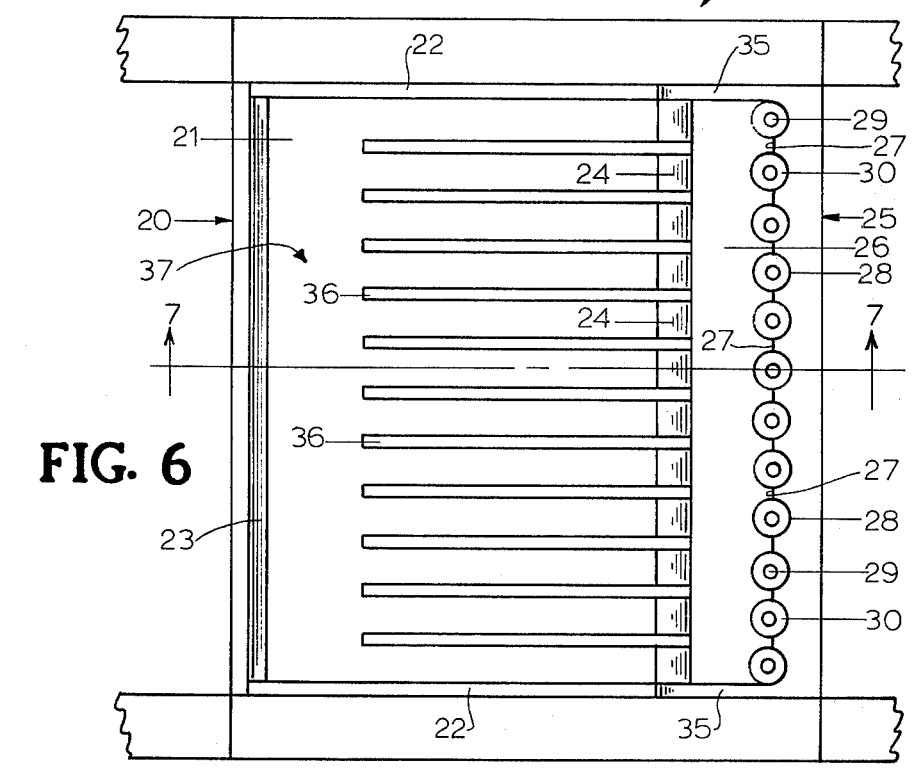
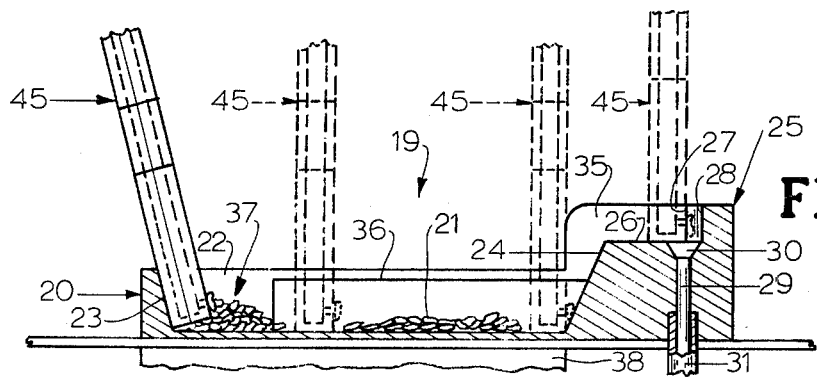

SEED PLANTER

BACKGROUND OF THE INVENTION

1. Field of the Invention

This invention relates to automatic and semi-automatic seeders. More specifically, the invention relates to a seeder for use in the bedding plant industry which will reliably pick up seeds from a seed tray and deposit them in a predetermined array into a flat or into peat cups.

2. Description of the Prior Art

The problem of getting millions of seedlings planted in a short period of time has forced the industry into mechanizing this operation. Horticulturists have recognized that direct seeding by machine can greatly cut labor costs in the initial planting of the seeds. By initially planting the seeds in individual peat cups, the step of transplanting the plants from flats to peat cups is eliminated. Thus, there is not setback in plant growth due to transplanting, and the plants are not contaminated by the handling U.S. Pat. No. 2,546,838 to Carl H. Tasche describes a seeder with a suction header which has a coordinate array of downwardly projecting suction tubes. Upon producing a suction in the header, the tubes pick up seeds from a seed tray. The header is then slidably moved on a horizontal track to a position over a flat where the suction is cut off and the tubes deposit the seeds in a coordinate array. U.S. Pat. No. 2,455,701 describes a seed counting machine using a similar principle.

Jiffy Products of America of West Chicago, Illinois, sells a Fricke-Jiffy Seeder which is designed to pick up and distribute through an arrangement of tubes a maximum of 96 seeds into a large flat. The Fricke-Jiffy Seeder is described in an article in the September 1970 issue of *Grower Talks* magazine published by Geo. J. Ball, Inc., of West Chicago, Ill. 60185.

The previously described prior art devices incorporate hollow suction tubes which point downward and are mechanically lowered into the seed tray to pick up seeds. It has been found that in normal operation, a certain percentage, around ten percent, of the tubes will not pick up a seed in a given cycle. The operator has no way visually inspect the ends of the tubes to determine whether each tube has picked up a seed. Furthermore, when the seed tray empties to less than one-half full, the seeds in the tray tend to pack into a hard layer and thus become much harder to pick up. Periodic refilling and stirring of the seeds is necessary to alleviate this problem. This packing phenomenon occurs most noticeably with "fuzzy" tomato seeds.

Thus, in this era of increasing labor cost, there is an acute need for an improved semi-automatic seeder for the small to medium sized nursery which allows essentially 100 percent pick up of seeds and which allows the operator to view each suction hole to assure that a seed has been picked up by each hole. Also, the seeder should be operable with a low level of seeds in the seed tray to prevent the unnecessary waste of unused seeds. The present invention provides a seeder capable of accomplishing these objectives.

SUMMARY OF THE INVENTION

A seeding apparatus for transferring seeds from a seed supply to a flat or individual peat cups incorporates a support frame mounted on legs which is adapted to reside upon a work table or other suitable surface. The frame supports a movable hand-manipulated seed pick-up head and a seed tray which holds the supply of seeds to be planted. The seed tray has a substantially flat bottom and interconnecting sides and is adapted to hold a predetermined supply of seeds. A vacuum source is connected to the pick-up head for providing a suction force through a line of equally-spaced apertures of a frontal face of the pick-up head. The apertures are smaller than the seeds so that the seeds are held in place over the apertures. These apertures are readily visible by the operator at all times so that he can check on the efficiency of operation, i.e., he can see which apertures have seeds and which do not. A flexible vacuum hose is used.

A manifold positioned adjacent to the seed tray provides a plurality of horizontally aligned and spaced openings along an upper surface. These openings are positioned and spaced so as to mate with the apertures on the face of the header so as to receive the seeds when released. An array of plastic tubes communicate with the openings and extend from beneath the manifold. The lower ends of the tubes are received by adjustable guide blocks which are positioned above the peat cups. Once the vacuum is applied to the pick-up head, the head is manually held and drawn through the seed tray and the head apertures pick up a desired number of seeds, all of which are in the view of the operator.

After picking up the seeds, the head is manually positioned so that upon shut-off of the vacuum supply, the seeds are dropped from the face of the seed pick-up head and fall by gravity into the manifold openings through the appropriate tubes and into the peat cups situated beneath the frame. The process is then repeated for additional seeding operations. The seeds in the supply tray are always maintained loose due to the back and forth motion applied to the seed pick-up head by the operator. The operator can thus assure a very efficient operation, since he always has view of the apertures in the pick-up head face and the manner of operation insures seed stirring.

DESCRIPTION OF THE DRAWINGS

FIG. 4 is an enlarged front elevation view of the seed pick-up head.

FIG. 5 is a side elevation view of the FIG. 4 seed pick-up head.

FIG. 6 is an enlarged plan view of the seed supply tray and manifold employed by the present invention.

FIG. 7 is a section view taken substantially along line 7—7 of FIG. 6 with the seed pick-up head illustrated in several positions.

DESCRIPTION OF THE PREFERRED EMBODIMENT

Figure 1:
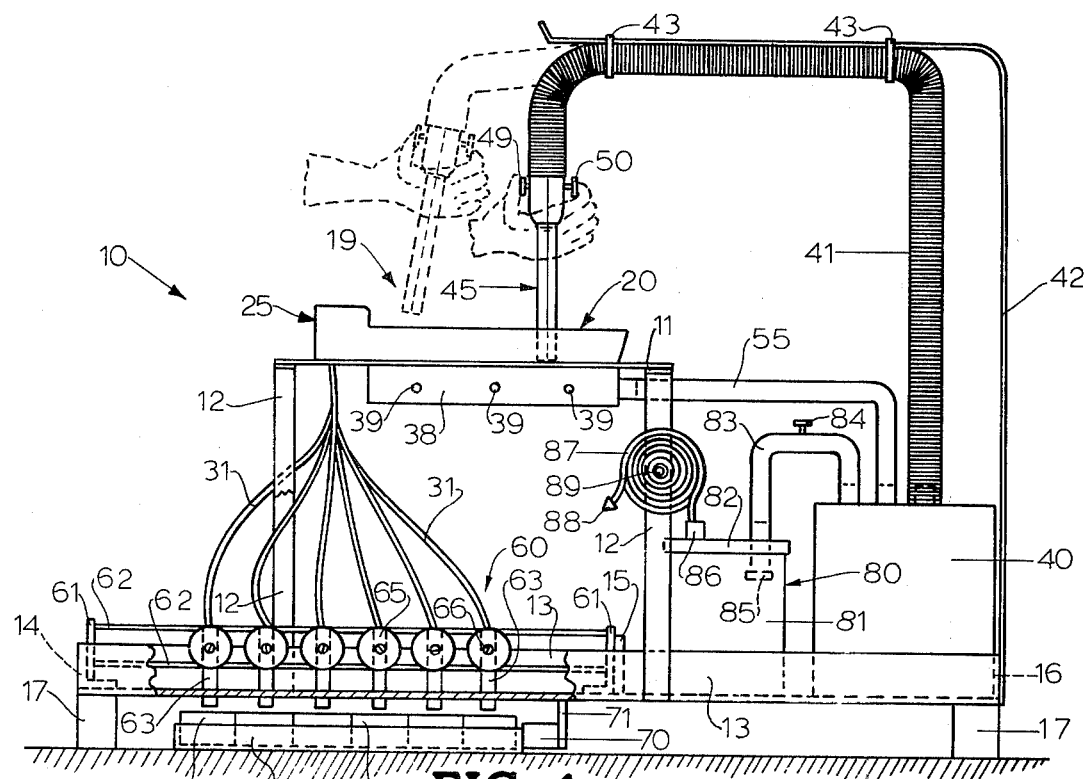
FIG. 1 is a side elevation view of the seed planter of the present invention with a portion of the frame broken away for purpose of illustration and with the seed pick-up dashed in a second position to illustrate its maneuverability.
Figure 2:
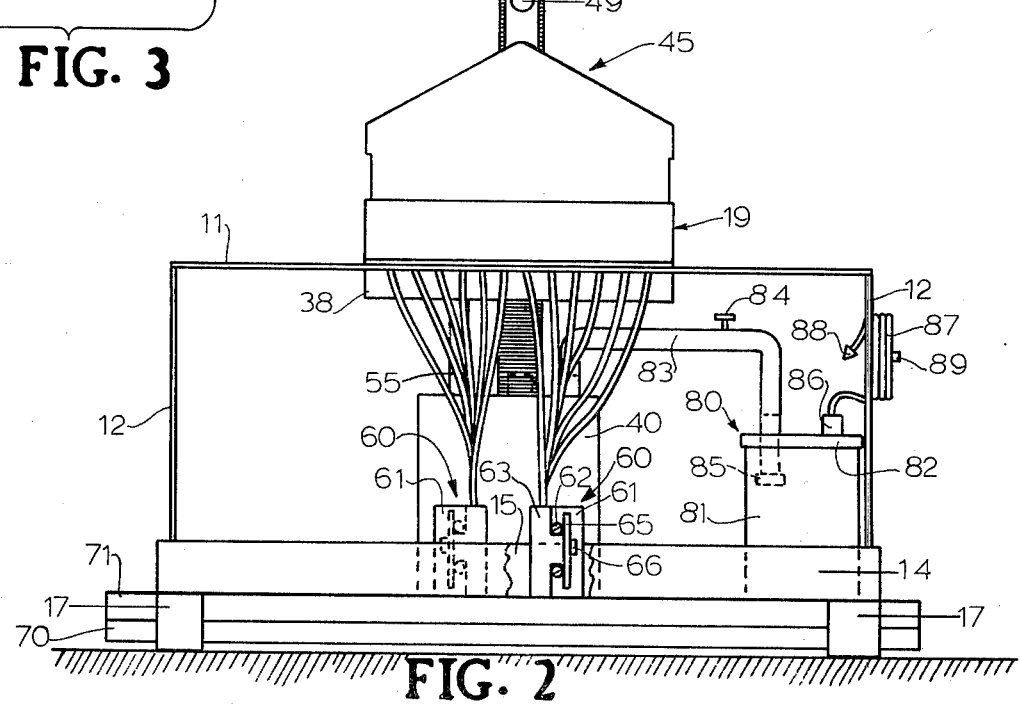
FIG. 2 is a front elevation view of the FIG. 1 seed planter and also with a portion of the frame broken away for purpose of illustration.

Referring to the drawings in detail and particularly to FIGS. 1 and 2, the seed planter 10 of the present invention comprises an upper support frame having top members 11 and vertical support members 12 and a bottom support frame which is made up of sides 13, front wall 14, intermediate wall 15 and back wall 16. Support members 12 are made integral with sidewalls 13 and legs 17 are made integral with front and back walls 14, 16.

A supply seed tray and manifold structure 19 comprising seed tray 20 and manifold 25 is preferably made as one unit as illustrated in FIGS. 6 and 7 but may be made as separate pieces. Structure 19 is mounted on top members 11 by any suitable means so that it is held in a fixed position. Seed tray 20 has a substantially flat bottom 21 and interconnecting sides 22. Rear wall 23 and front wall 24 slope outwardly and upwardly from bottom 21. Wall 24 is formed as a part of manifold 25 which has a flat top wall surface 26. An upright wall 27 extends upwardly from the front edge of surface 26 and is formed with a plurality of curved recessed cavities 28. A plurality of holes 29 extend downwardly from surface 26, rearwardly of recesses 28 and completely through manifold 25. Countersinks 30 at the uppermost ends of holes 29 provide inward tapered surfaces whose function is described later. A predetermined number of such mating recesses, holes and countersinks are situated in the top of manifold 25, and in the case of the preferred embodiment, as shown in FIG. 6, there are 12 such holes. These 12 holes are positioned, as seen from later description, to correspond to 12 peat cups in which seeds are to be placed.

Sidewalls 22 have continuation portions which form walls 35 and which extend upward from sides 22 and join with the top of manifold 25 as seen in FIG. 7. A plurality of parallel, upright guide walls 36 extend rearwardly from tapered wall 24 for a predetermined distance on bottom 21 of tray 20. Walls 35 act as partitions to divide the seeds and form separate channels leading to the individual seed drop holes 29 in manifold 25. A substantially open seed storage area 37 resides between the ends of guide walls 36 and tapered rear wall 23. Hollow plastic tube members 31 are received in the base of manifold 25 and form extensions of the seed drop holes 29 at the base of manifold 25. Each hole 29 has a mating tube 31. Also formed as an integral part of seed tray 20 is an open heat exchange chamber 38 which is located beneath the portion of tray 20 in which the seeds are situated and whose function is later described.

A vacuum pump 49 is situated at the rear of the support frame adjacent back wall 16 and approximately midway between the sidewalls. Vacuum pump 40 has connected therewith a flexible, extendible hose 41 which extends to the seed pick-up head 45 and connects thereto. Hose 41 is supported by hose support rod 42 and hose brackets 43. Rod 42 is welded or otherwise secured to back wall 16 of the support frame structure.

Seed pick-up head 45 (FIGS. 4 and 5) is molded as two pieces from plastic or any other suitable, but preferably transparent, material. It has been found that a transparent material substantially aids the operator in seeing the seeds on the front of the head 45. Pick-up head 45 is hollow, thin-walled and glued together at seam 46. The neck portion 47 of head 45 provides a handle and is round and is adapted to receive hose 41. Situated in neck portion 47 and accessible for finger operation is a conventional suction control valve 48 with push buttons 49, 50. FIG. 1 illustrates how head 45 is held by the operator by neck 47 and how valve 48 is opened or closed by pushing buttons 49, 50. Seed pick-up head 45 is relatively flat on both sides and has teeth-like members 51 molded in the lowermost end of head 45. The openings 53 between teeth 51 have a width and depth sufficient to accommodate upright guide walls 36 of seed tray 20. Thus, head 45 can be pulled or pushed back and forth in tray 20 with teeth 51 riding in the channels formed between the walls 36. One side of head 45, which is called the face side, since it will face the operator when in use, has a plurality of evenly spaced apertures 52 drilled in the lower portion of teeth 51. Each of the teeth 51 has an aperture 52 as can best be seen in FIG. 4. Apertures 52 are of a predetermined size so that any size seed being planted will not be small enough to be drawn through these apertures 52. Once valve 48 is opened and pump 40 is energized, suction is drawn within head 45 and through apertures 52. The use of head 45 will be more specifically described later in the description.

The exhaust line 55 from vacuum 40 is piped to heat exchange chamber 38 beneath seed tray 20. The exhaust is fed into the chamber and is allowed to exit chamber 38 through holes 39. Such exhaust air will normally be warm as it exists pump 40 and has been found useful as a heat source for heating the seed tray 20. Application of such heat causes any moisture in the seeds in the tray to be lowered or eliminated which in turn reduces or prevents the tendency of the seeds to stick together as encountered in other devices.

Figure 3:
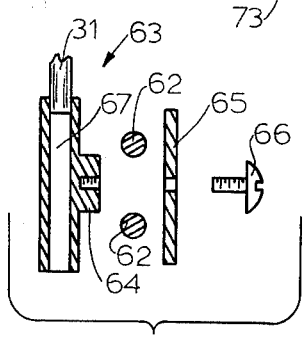
FIG. 3 is an enlarged, exploded section view of one of the seed tubes and associated tube receiving block and adjusting means.

Two support assemblies 60 are provided to hold the lower ends of tubes 31 in the selected array over peat cups 73. Each support assembly 60 includes two opposing end support members 61 which have a pair of spaced rods 62 integrally secured thereto. The support assemblies 60 are mounted on walls 14 and 15 so that they are laterally adjustable between sidewalls 13. At six predetermined and adjustable points on each of a pair of support assemblies 60 there are located adjustably mounted tube receiving blocks 63. The enlarged and exploded view of FIG. 3 will be used to describe the construction of one support assembly 60 and blocks 63. Blocks 63 are positioned at their desired location with protrusion 64 of block 63 residing between a pair of support assembly rods 62. A flat washer 65 is placed adjacent rods 62 and a screw 66 is passed through washer 65 and tightened so that washer 65 is tight against rods 62 and protrusion 64. Any number of rows of support assemblies 60 or tube receiving blocks 53 could be employed to correspond to the chosen coordinate array of peat cups 73. Two such support assemblies 60 with six receiving blocks 63 on each assembly 60 are illustrated in FIGS. 1 and 2. Tubes 31 which originate in manifold 25 at the seed drop holes 29 extend downward therefrom and mate with respective holes 67 in blocks 63 (FIG. 3). Each hole 67 allows a seed dropped into a respective hole 29 in manifold 25 to pass by gravity through tube 31 and finally out the base of block 63. Blocks 63 are prepositioned so that equal spacing is achieved. A locating lock 70 is held in a fixed position by support member 71 which is integrally secured to and below sidewalls 13. Block 70 is used to locate a tray 72 filled with peat cups 73 so that the two rows of blocks align with a selected two rows of the peat cups 73 in tray 72. The number of rows of support assemblies 60 and the number of blocks 63 employed are determined by the size tray 72 and the number of peat cups 73 held by the tray 72 and may vary accordingly.

Another feature of the present invention is the easily accessible seed removal and cleaning apparatus 80. A cannister 81 is positioned within the support frame. Cannister 81 has a removable top 82 which receives a suction line 83 from pump 40. Suction line 83 has a normally closed valve 84 which is manually opened when a suction is desired from pump 40. Suction line 83 has a filter 85 situated inside cannister 81 which filters any air drawn from cannister 81 into line 83 and then on into pump 40 where it is then exhausted through line 55 as previously described. Connection 86 in top 82 receives a hose 87 which in turn mounts a nozzle 88. When valve 84 is opened and pump 40 is energized, nozzle 88 is used to suck up unused seeds from tray 20 when a planting operation is completed. While not being used, line 87 is coiled and hung on a hose support rod 89 on support member 12. When the seeds are removed by nozzle 88 from tray 20, they are drawn through line 87 into cannister 81 where the seed are collected for later removal and reuse. Trash and dirt are trapped in filter 85 and prevented from being drawn into pump 40. When not is use, valve 84 is closed.

The description will now shift to a description of a typical seeding operation employing the seed planter 10 of this invention. A quantity of the seeds to be planted are placed in tray 20 in the open area 37. Vacuum pump 40 is energized and the operator manually lifts seed pick-up head 45 by grasping the neck portion 47 and places the head in position in tray 20 against tapered wall 23 (see solid line position of FIG. 7). At this point, seeds are sucked up against apertures 52 of teeth 51 and in view of the operator. As the head 45 is pulled forward toward the operator, so that teeth 51 ride in the channels between walls 36, other seeds are pulled forward until they reach tapered wall 24 at which point head 45 is lifted so that the operator can view the apertures to determine whether at least one seed is trapped by each aperture. The head 45 is then moved forward against upright wall 27 at which time apertures 52 are in vertical alignment with the respective recesses 28 and are over the seed drop holes 29 and countersinks 30. Valve 48 is now closed by the operator which removes suction from head 45 and the seeds drop free from the apertures 52 by action of gravity. The seeds then fall into holes 29, through tubes 31, through holes 67 in blocks 63, and into the respective rows of peat cups 73 in tray 72. Tray 72 will have been previously positioned beneath blocks 63 and against tray locating block 70. One such operation in the embodiment illustrated fills twelve peat cups. Tray 72 can then be moved forward and another such operation made until all the peat cups 73 in tray 72 have received seed. Once a tray is filled, another tray is placed in position. When the operator is through seeding as many cups as he desires, nozzle 88 and hose 87 are used, upon actuation of valve 84, to draw all unused seed from tray 20 into cannister 81 for later use and the dirt and trash into filter 85 for disposal to waste.

Figure 8:
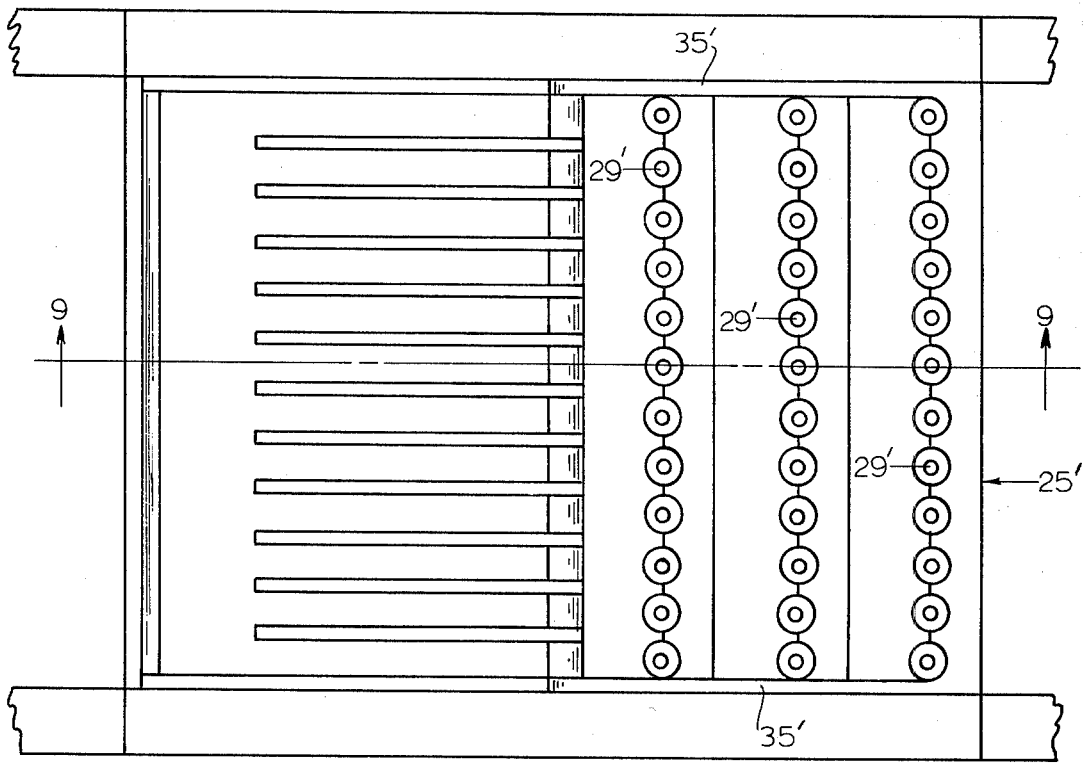
FIG. 8 is a view similar to FIG. 6 but illustrating an alternate embodiment of the seed supply tray and manifold.
Figure 9:
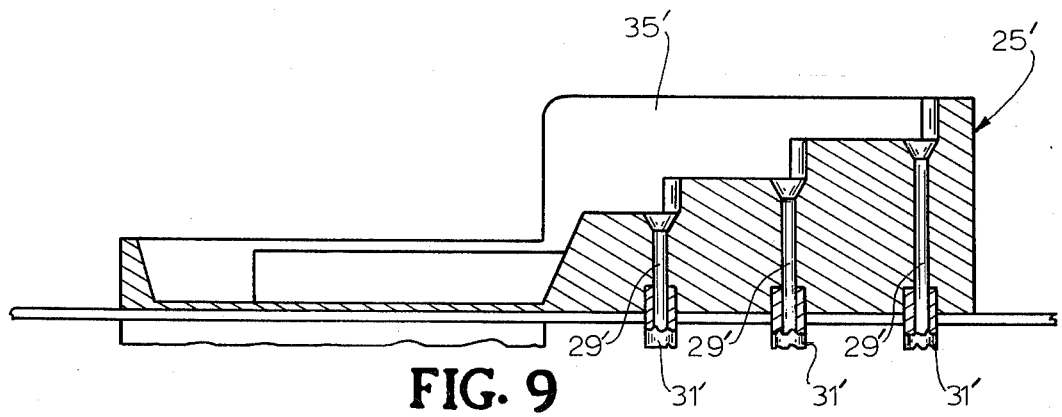
FIG. 9 is a section view taken substantially along line 9—9 of FIG. 8.

FIGS. 8 and 9 illustrate an alternate embodiment of the seed tray in which a three-tier manifold is employed for seeding a greater number of cups in each operation between tray movements. Manifold 25' differs from manifold 25 in that it has three times as many seed drop holes 29'. Walls 35' are made higher than walls 35 in the first embodiment to assist in maintaining head 45 in manifold 25' when using the two top tiers. Corresponding tubes 31' are employed for all holes 29'. Tubes 30' in the second embodiment function the same as tubes 31 for the first embodiment in that they deliver seed to tube receiving blocks 63' (not shown). It can be seen also that there must be a greater number of mating blocks 63' for each tube 31'.

In an alternative arrangement, the seed try can be made without the interior upright wall members 36 and the seed pick-up head can be made without the teeth 51, in which case the apertures would simply be located in the face of the head and the sidewalls 22 would guide head during seed pick up. The operation would essentially remain the same and with the advantages of being able to see the seed, of knowing that all apertures pick up a seed and of being able to hand manipulate the pick-up head for stirring, etc., on the smooth interior bottom of the seed container.

In operation, it has been found that the seed planter of the present invention works extremely well with zinnia, tomato, pepper, broccoli, cabbage and pansey seeds. Petunia seeds require much smaller apertures than do most other seeds but an interchangeable head can be supplied with the device. Also, it has proven very advantageous to have the apertures positioned in the side of the seed head since the seeds are not compacted when seeds are picked up and the raking back and forth of the seed head keeps the seeds stirred and loose. It has also been found that by adjusting the amount of vacuum to the seed head, the operator is able to pick up single or multiple seeds to insure practically 100% germination of at least one seed in all seeding cups. with the flexibility of the hand-held and manipulated seed pick-up head, the operator can view the apertures to determine if all apertures have seed.

With the above stated advantages and possible modifications, it is believed that no other seeder is available that lends itself to such wide use and wide range of flexibility.

What is claimed is:

1. An apparatus for picking up individual seeds from a bulk supply at a first location and transferring such seeds to a second location for dispersal in spaced array, comprising in combination:
   a. a support structure;
   b. a rectangular, box-like seed tray mounted on said structure at said first location and having a substantially smooth interior bottom wall, a pair of parallel sidewalls, a rear wall, and a front wall substantially perpendicular to said sidewalls and said tray being adapted to hold a predetermined bulk supply of seeds;
   c. a vacuum source having a flexible suction tube extending therefrom;
   d. a suction head having an upper grip portion and a lower portion having on a frontal, vertical face thereof a plurality of apertures laterally spaced in a predetermined pattern and communicating with said suction tube, said apertures being shaped and sized to retain a predetermined sized thereon upon the application of suction thereto, said head having a lateral width at its base less than the distance between said tray sidewalls and being adapted to being maneuvered forwardly and rearwardly within said tray as determined by the operator thereof whereby upon application of suction from said source and the placement of said apertures proximate said bulk seed supply individual seed may be stirred and positioned on the frontal face of said head so as to be drawn and held on each of said apertures and in view of the operator of said apparatus;

e. manifold means positioned forward of said tray front wall and having a flat upper surface, said flat surface having at least one set of laterally spaced vertical openings, each such set conforming with the lateral spacing of said head apertures and adapted to receive seeds from said apertures;

f. tubular path means positioned adjacent said tray and establishing a plurality of tubular paths, the first upper ends of said tubular paths communicating with said manifold openings for receiving seeds therefrom, and the second lower ends of said tubular paths being grouped and positioned together for discharging such seeds in a predetermined spaced array; and g. valve means accessible to the operator of said apparatus enabling vacuum to be applied to said head and seed to be drawn onto said apertures when said head is positioned in said tray and to release said seeds from said apertures into said manifold vertical openings for discharge through said lower end of said tubular paths when said apertures are moved proximate said openings.

2. The apparatus of claim 1 wherein least a portion of the interior of said tray is subdivided by a plurality of laterally spaced vertical guide walls and said head lower portion has a plurality of toothlike formations with each aperture being in a selected tooth formation and with the slots between said teeth formations being adapted to fit over said guide walls for guiding said head in said tray during seed pick-up.

3. The apparatus of claim 1 wherein said vacuum source is adjustable to regulate the vacuum level thereof thereby enabling the operator of said apparatus to control the number of seeds picked up by each said aperture.

4. The apparatus of claim 1 wherein said valve means comprises a hand valve located on said head upper portion.

5. The apparatus of claim 1 wherein said upper ends of said plurality of tubular paths are arranged in groups with the tubular paths in each group terminating at a selected elevation.

6. The apparatus of claim 1 wherein said tray front wall is sloped outwardly and upwardly from said bottom wall for facilitating the sliding of said head along such front wall and onto said manifold flat upper surface.

7. The apparatus of claim 1 wherein said manifold includes upright wall means forward to each set of said manifold openings and adapted to act as a stop barrier and alignment means for said suction head preparatory to discharge of said seeds into said openings.

8. The apparatus of claim 1 wherein said manifold includes a plurality of flat surfaces, each said surface providing at least one said set of laterally spaced openings.

9. The apparatus of claim 1 wherein said tubular path means comprises a plurality of flexible tubes.

10. An apparatus for picking up individual seeds from a bulk supply at a first location and transferring such seeds to a second location for dispersal in a uniformly spaced array, comprising in combination:

a. a support structure;

b. a seed tray mounted on said structure at said first location and having a substantially smooth interior bottom and interconnecting sidewalls and being adapted to hold a predetermined bulk supply of seeds;

c. a vacuum source located proximate said support structure and having a flexible suction tube extending therefrom;

d. a suction head having an upper hollow handle grip portion connected to said suction tube and a lower portion having on a frontal, vertical face thereof a plurality of apertures laterally spaced in a predetermined pattern and communicating through the interior of said head with said handle grip portion, said apertures being shaped and sized to retain a predetermined sized seed thereon upon the application of suction thereto, said head being adapted to being maneuvered forwardly and rearwardly within said tray as determined by the operator thereof whereby upon application of suction from said source and the placement of said apertures proximate said bulk seed supply individual seed may be drawn and held on each of said apertures and in view of the operator of said apparatus;

e. tubular transfer means positioned adjacent said tray and establishing a plurality of tubular paths, a first upper end of each tubular path being vertically oriented and laterally spaced to conform to the lateral spacing of said apertures such that each aperture when holding seed can be mated with a respective one of said tubular paths for receiving such seed, a second lower end of each tubular path being grouped and positioned together for discharging such seeds in a predetermined, uniformly spaced array;

f. valve means accessible to the operator of said apparatus enabling vacuum to be applied to said head and seed to be drawn into said apertures when said head is positioned in said tray and to release said seeds from said apertures into said upper end of said tubular paths for discharge through said lower end of said tubular paths when said apertures are moved proximate said openings; and g. heat exchange means proximate said tray for connecting the exhaust of said vacuum source to said heat exchanger means for utilizing said exhaust to continuously heat said seeds during operation of said apparatus.

11. The apparatus of claim 10 wherein said heat exchanger means comprises a heat exchange chamber located under said seed tray and adapted to receive said exhaust for circulation and flow through said chamber to said seeds.

12. An apparatus for picking up individual seeds from a bulk supply at a first location and transferring such seeds to a second location for dispersal in a uniformly spaced array, comprising in combination:

a. a support structure;

b. a seed tray mounted on said structure at said first location and having a substantially smooth interior bottom and interconnecting sidewalls and being adapted to hold a predetermined bulk supply of seeds;

c. a vacuum located proximate said support structure and having a flexible suction tube extending therefrom;

d. a suction head having an upper hollow handle grip portion connected to said suction tube and a lower portion having on a frontal, vertical face thereof a plurality of apertures laterally spaced in a predetermined pattern and communicating through the interior of said head with said handle grip portion, said apertures being shaped and sized to retain a predetermined sized seed thereon upon the application of suction thereto, said head being adapted to being maneuvered forwardly and rearwardly within said tray as determined by the operator thereof whereby upon application of suction from said source and the placement of said apertures proximate said bulk seed supply individual seed may be drawn and held on each of said apertures and in view of the operator of said apparatus;

e. tubular transfer means positioned adjacent said tray and establishing a plurality of tubular paths, a first upper end of each tubular path being vertically oriented and laterally spaced to conform to the lateral spacing of said apertures such that each aperture when holding seed can be mated with a respective one of said tubular paths for receiving such seed, a second lower end of each tubular path being grouped and positioned together for discharging such seeds in a predetermined, uniformly spaced array;

f. valve means accessible to the operator of said apparatus enabling vacuum to be applied to said head and seed to be drawn into said apertures when said head is positioned in said tray and to release said seeds from said apertures into said upper end of said tubular paths for discharge through said lower end of said tubular paths when said apertures are moved proximate said openings; and g. a suction hose and collection assembly for sucking unused seeds out of said seed tray and collecting said unused seeds in a vessel, said assembly comprising:

i. a hose having an inside diameter larger than the seeds to be picked up and having a first terminal end portion adapted to pick up seeds from said tray;

ii. a suction line having one end connected to a vacuum port of said vacuum source;

iii. a closed seed collection vessel located proximate said seed tray, said vessel having a first opening for receiving a second terminal end portion of said hose, and having a second opening for receiving the other end of said suction line;

iv. filter means located inside of said vessel and providing a seed barrier to said vessel second opening for preventing seeds from passing into said suction line and thereby causing seeds to collect in said vessel; and v. valve means for controlling the suction in said suction line, whereby upon opening said valve a suction is created through said assembly enabling said hose to suck seeds therethrough for collection of seeds in said vessel.

\* \* \* \* \*

UNITED STATES PATENT OFFICE
CERTIFICATE OF CORRECTION

Patent No. 3,986,638     Dated October 19, 1976

Inventor(s) Harold F. DeHart

It is certified that error appears in the above-identified patent and that said Letters Patent are hereby corrected as shown below:

Col. 1, line 22, a period should be inserted at end of sentence

Col. 1, line 46, --to-- should be inserted after "way".

Col. 2, line 9, "of" first occurrence should be -- on --.

Col. 3, line 56, "49" should be --40--.

Col. 6, line 50, --a-- should be inserted after --in--.

Col. 6, line 67, --seed-- should be inserted after "sized".

Col. 7, line 34, --at-- should be inserted after "wherein".

Col. 7, line 61, "to" should be --of--.

Col. 9, line 3, --source-- should be inserted after "vacuum".

Signed and Sealed this

First Day of March 1977

[SEAL]

Attest:

RUTH C. MASON
Attesting Officer

C. MARSHALL DANN
Commissioner of Patents and Trademarks